Sept. 4, 1934.  F. W. PETERS  1,972,355
ROLLER BEARING
Filed Feb. 21, 1933  4 Sheets-Sheet 1
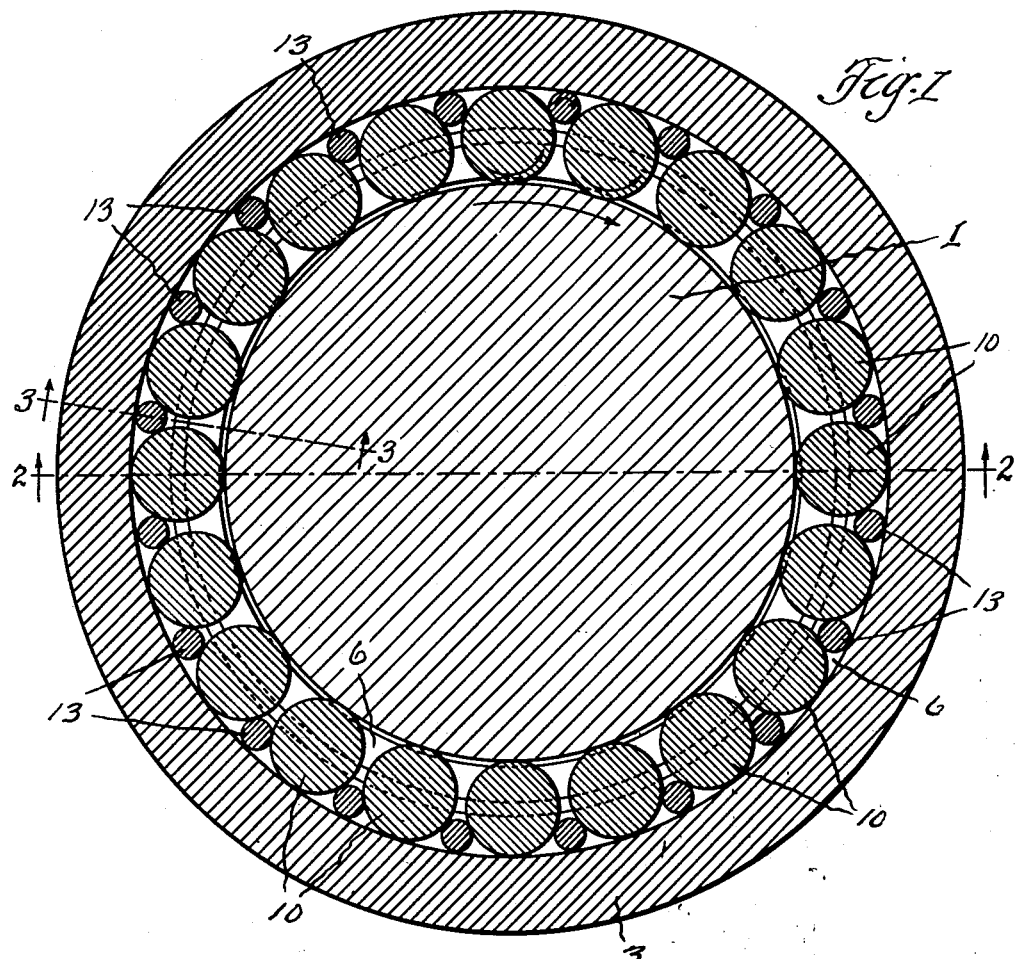
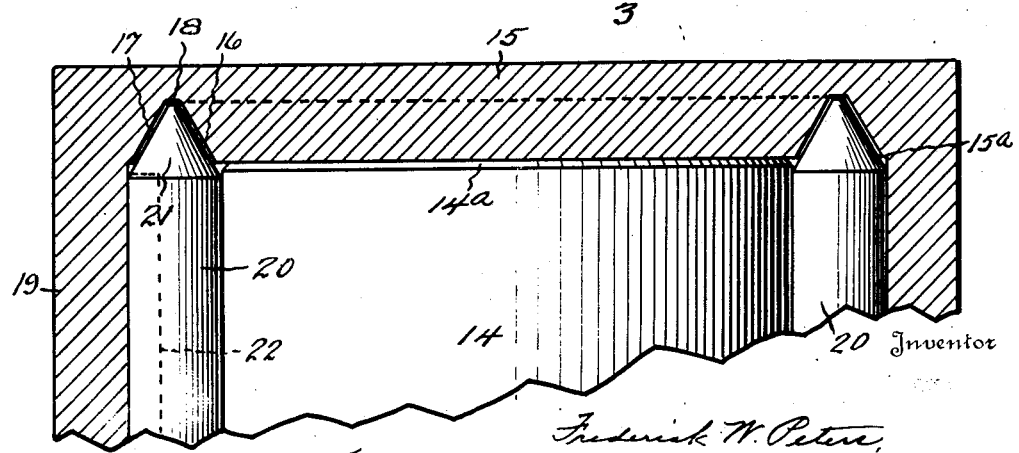

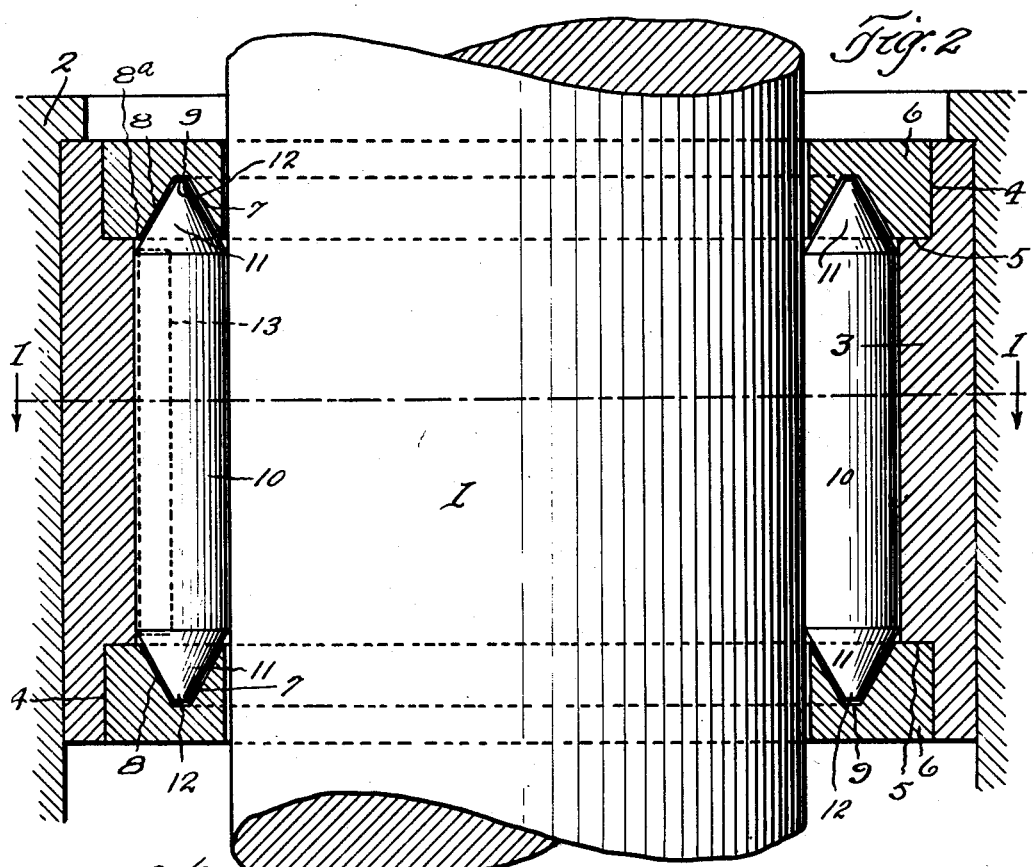
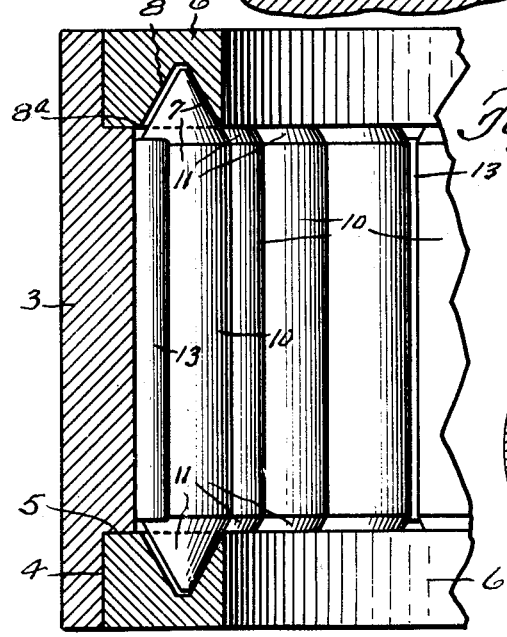
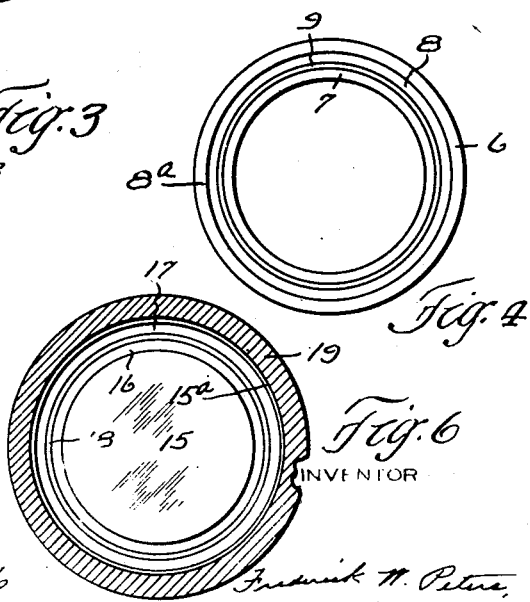
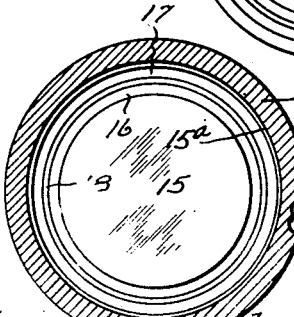

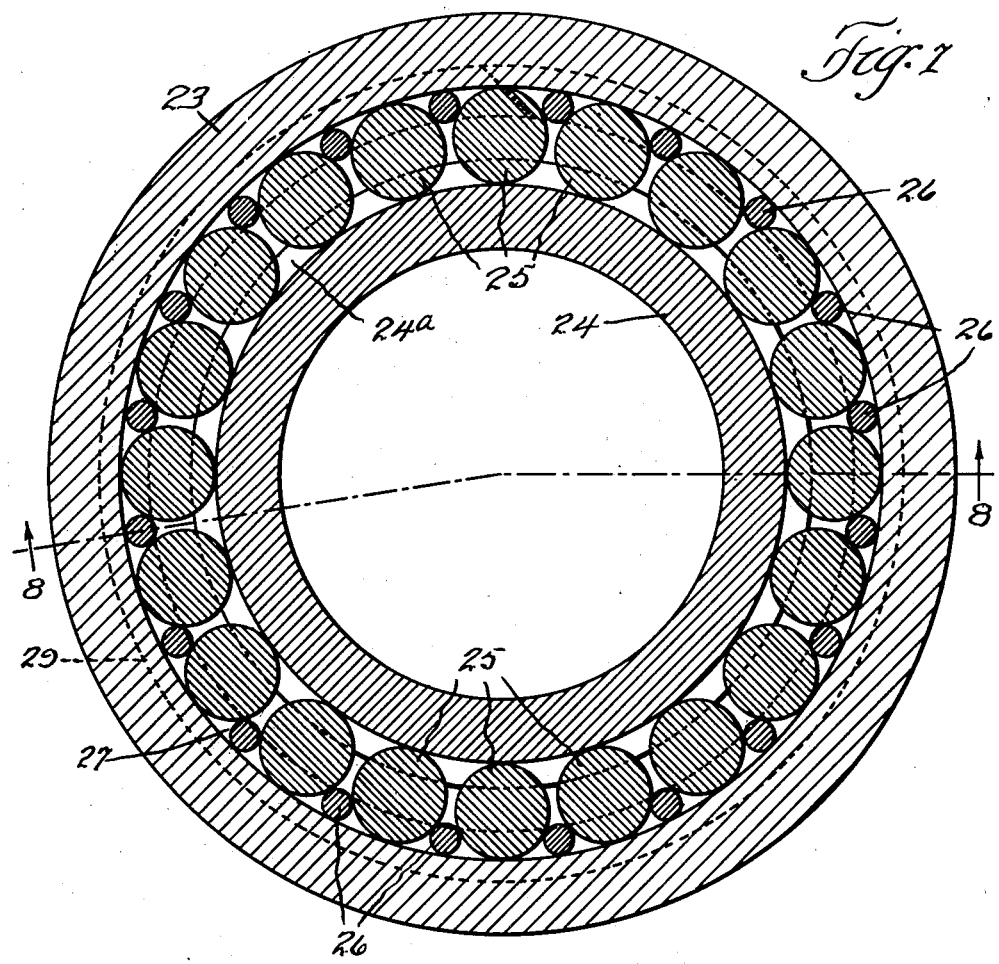
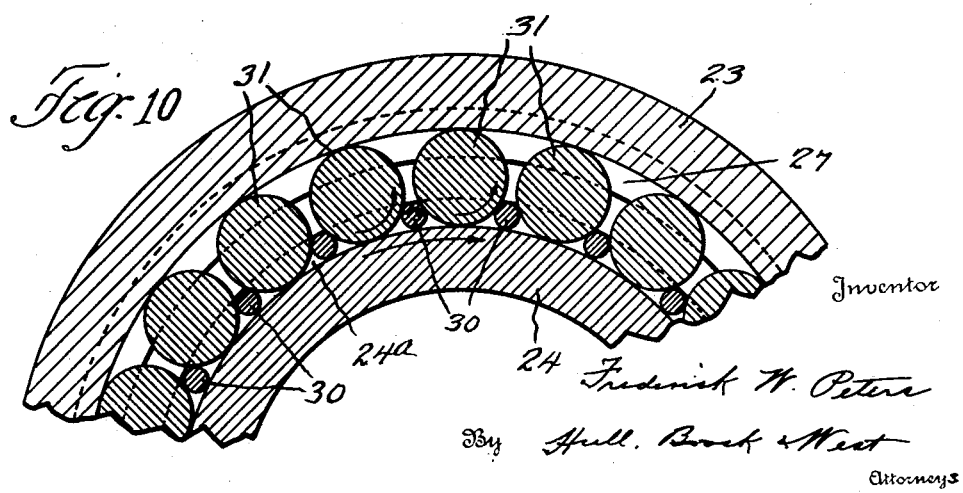

Sept. 4, 1934.  F. W. PETERS  1,972,355

ROLLER BEARING

Filed Feb. 21, 1933  4 Sheets-Sheet 4

Inventor
Frederick W. Peters,
By Hull, Brock & West,
Attorneys

Patented Sept. 4, 1934

1,972,355

UNITED STATES PATENT OFFICE 1,972,355

ROLLER BEARING

Frederick W. Peters, Cleveland, Ohio

Application February 21, 1933, Serial No. 657,809

1 Claim. (Cl. 308—206)

This invention relates to roller bearings, and has for its general object to provide a bearing of this character which will operate with a minimum of friction, whereby the bearing will be capable of long use under heavy torque without deterioration; also to provide a bearing wherein all of the rollers will rotate in coordination and in the operation of which bearing sliding movement between the rollers on the one hand and the journal and the bearing sleeve on the other hand will be reduced to a minimum. A further object of the invention is to provide a bearing of the character referred to which is adapted to realize the foregoing objects through the combination of relatively large rollers with relatively small rollers interposed between and serving as guides and as centering and spacing means for the relatively large rollers.

Figure 9:
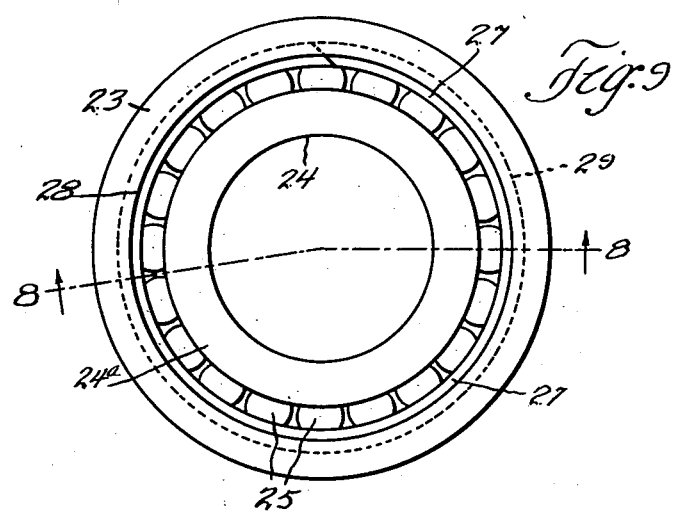
Figure 8:
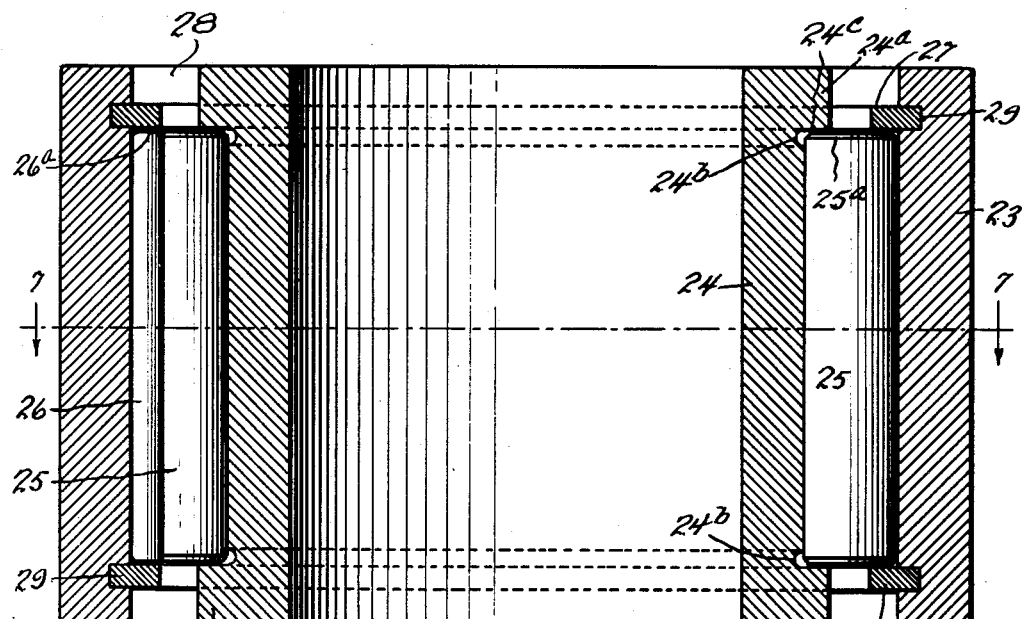

Further and more limited objects of the invention will appear hereinafter in connection with the detailed description of the drawings wherein Fig. 1 is a transverse sectional view through a bearing constructed in accordance with my invention, the section being taken on the line 1—1 of Fig. 2 looking in the direction of the arrows; Fig. 2 a longitudinal sectional view through said bearing, corresponding substantially to the line 2—2 of Fig. 1, the journal member being shown in elevation; Fig. 3 a detail in sectional elevation of the surrounding sleeve and the rollers, with the means for holding the ends of the larger rollers in position; Fig. 4 an elevation of one of the rings in which the ends of the larger rollers shown in Figs. 1-3 inclusive, are mounted; Fig. 5 a detail in sectional elevation showing my invention applied to the end of a journal; Fig. 6 a detail in sectional elevation showing the end thrust plate used in connection with the form of my invention shown in Fig. 5; Fig. 7 a view similar to Fig. 1 showing a bearing unit embodying my invention, the section being taken on the line 7—7 of Fig. 8; Fig. 8 a longitudinal sectional view through the bearing shown in Fig. 7, and corresponding substantially to the lines 8—8 of Figs. 7 and 9; Fig. 9 an end elevation of the bearing shown in Figs. 7 and 8; and Fig. 10 a detail in transverse section showing a modified form of my bearing.

Referring first to Figs. 1 to 4 of the drawings, 1 denotes a journal member, which may be a shaft, and 2 denotes a housing or seat for the bearing sleeve 3, the ends whereof are recessed as shown at 4, 5, to provide seats for the retaining rings 6, the inner cylindrical surfaces of which are adjacent to but spaced a slight distance from the shaft 1 to provide a running clearance therewith.

The rings are preferably press-fitted into their seats and are provided each with an annular recess projecting outwardly from the inner face thereof and providing a race for the ends of the larger rollers, the races being preferably of approximately V-shape, the sides of the races being indicated at 7 and 8 and the bottoms of the races being indicated at 9.

Interposed between the shaft 1 and the inner cylindrical surface of the sleeve 3 are rollers 10, each having a frusto-conical end 11, there being a clearance provided between the conical surfaces of the ends of the rollers and the surfaces 7 and 8 of the races which are provided respectively therefor. This clearance is sufficient to enable the extreme ends 12 of each of the rollers to abut against the bottoms 9 of the races, should the rollers be subjected to sufficient thrust exerted in the direction of the length thereof to cause the engagement of their ends with such race bottoms. This action is more apt to occur where my bearing is employed in connection with a shaft which is rotating about an axis other than a horizontal axis.

Interposed between the rollers 10 and the inner face of the sleeve 3 are smaller rollers 13. Each of these rollers is of such size as to fit freely in the space between the outer surfaces of the two larger rollers 10 adjacent thereto as well as to engage the inner surface of the sleeve 3 when the journal is subjected to load, whereby a radial thrust is exerted between the journal and the corresponding portion of the sleeve. For example, where the rollers 10 are $\frac{3}{16}$ inch in diameter and the rollers 13 are $\frac{1}{16}$ inch in diameter, there will be a clearance of approximately 1/1000th to 2/1000th inch between the rollers 10 and the cooperating surfaces of the journal member and sleeve member; while, in the case of the guide rollers 13, there will be a clearance of from 2/1000th to 3/1000th inch between the same and the inner surface of the sleeve, which clearance not only allows these rollers to be inserted, notwithstanding variations in the diameters of the larger and smaller rollers, due to manufacturing conditions, but which clearance corresponds approximately to the thickness of the film of oil usually employed in roller bearings. Due to the smallness of the clearances, no attempt has been made to show the same in the drawings. The rollers 13 are preferably of somewhat less length than the distance between the rings 6. By mounting the smaller rollers in this manner, they are permitted to have a slight longitudinal movement without engaging the rings 6, while they serve as guiding, centering, and spacing means for the larger rollers, whereby, as will be apparent by reference more particularly to Fig. 2, the larger rollers are maintained at all times out of contact with one another and both the larger and the smaller rollers rotate in cooperation with each other, as will be evident from the arrows on Fig. 1. Furthermore, practically no load is imposed on the smaller rollers and there is practically no sliding of these rollers on the inner surface of the sleeve 3.

The retaining rings 6, as pointed out hereinbefore, are provided with V-shaped races or recesses for the tapered ends of the larger rollers 10 and, when necessary, serve to limit the longitudinal movements of the said rollers, but without any binding action between the tapered end portions of these rollers and the sides of the races. Due to the positions of the smaller rollers 13, these same retaining rings also serve to limit the longitudinal movements of these rollers, being provided each with an annular surface 8ª located radially outwardly of the V-shaped race or recess therein to receive the end thrusts of the said rollers.

Because of the construction and arrangement of the parts as shown and described, I am enabled to obtain a bearing which is practically frictionless in operation and one in which there is practically no sliding friction between the rollers themselves and wherein the sliding friction between any of the rollers and the parts of the bearing with which they respectively cooperate is reduced to a minimum. Due to the small clearances referred to (which are approximately equal to the thickness of the film of oil) there is at all times a direct pressure of the journal member and the sleeve member upon the larger rollers, and a rolling pressure between the smaller rollers and the larger rollers. The smaller rollers are themselves practically frictionless in operation and serve as a cage and as spacers for the larger rollers, since the tapered ends of the larger rollers are normally out of contact with the walls of the races in the rings 6.

In Figs. 5 and 6 there is shown a form of my invention wherein the roller arrangements shown in Figs. 1, 2 and 3 are adapted for cooperation in an end-thrust mounting for a journal, an instance of such end-thrust mounting being the mounting for the trunnion of a universal joint.

In these views, 14 denotes a journal member which, as stated, may be the trunnion of a universal joint. The end of this journal member is shown as slightly beveled, as indicated at 14ª, and this end is adapted to engage an end thrust plate 15, the central portion of which is adapted to be engaged by the end of the journal member 14 and which is provided beyond such central portion with races 16, 17 and 18, similar to the races 7, 8 and 9. The plate 15 is preferably made integral with the bearing sleeve 19, instead of being press-fitted into the bearing sleeve, as is the case in the form of my invention shown in Figs. 1, 2, 3 and 4. Interposed between the journal member 14 and the sleeve 19 are the large rollers 20, which are identical in construction with the rollers 10, each of the large rollers having frusto-conical ends 21 which cooperate with the race 16, 17, 18 in the plate 15 and a similar race in the ring (not shown) at the opposite end of the bearing and which ring is identical in construction and in the manner of mounting the same in the bearing sleeve with the rings 6 shown in Figs. 1, 2, 3 and 4.

Interposed between the rollers 20 are the small rollers 22, which are identical in construction and arrangement with the construction and arrangement of the small rollers shown in Figs. 1 to 3 inclusive. The annular surface for limiting the longitudinal movements of the rollers 13 toward the plate 15 is indicated at 15ª on Fig. 5. The ring (not shown) at the opposite end of the bearing shown in Fig. 4 is provided with an annular surface corresponding to the surface 8ª which appears on Figs. 2 and 3.

The form of my invention shown in Figs. 5 and 6 possesses all of the advantages of the forms shown in Figs. 1, 2, 3 and 4 and, in addition, serves as a means for effectually taking any end thrust that may be exerted thereupon by the journal member 14.

In Figs. 7 to 9 inclusive there is shown a bearing unit, which is adapted for application to a rotating member, such as a shaft, and which differs from the form of my invention shown in Fig. 1 in being a self-contained unit having an inner sleeve and different retaining means for the large and small rollers.

Referring to Figs. 7, 8 and 9, 23 denotes the outer sleeve member and 24 the journal member, in this case the inner sleeve member, and 25 denotes the larger rollers interposed between the said sleeve members and 26 the smaller rollers which are interposed between the larger rollers and the outer sleeve member. The larger rollers will have the same clearances with respect to the inner and outer bearing members as is the case with the larger rollers in the preceding views; and the smaller rollers will have the same clearances with respect to the inner surface of the outer sleeve member as is the case with the smaller rollers in the preceding views.

It will be noted that the rollers 25 are provided with short reduced ends 25ª, which may be rounded or beveled, as shown at 25ᵇ; also that the ends of the rollers 26 are preferably slightly rounded, as shown at 26ª. The inner sleeve 24 has formed therewith and at opposite ends thereof integral retaining rings 24ª, each in the shape of a radially outwardly extending flange, the inner annular surface of which is adapted to overhang portions of the ends of the rollers 25 and thereby serve to limit the longitudinal movements thereof as well as to assist in retaining these rollers in place between the sleeves 23 and 24. It will be noted further that, adjacent to the opposite ends of the rollers 25, the sleeve 24 is provided with annular grinding cuts 24ᵇ.

Cooperating with the retaining rings 24ª to retain the rollers 25 and 26 in place are split snap rings 27, each of which is adapted to be contracted in the appropriate annular space 28 between the ends of the sleeve member 23 and the cylindrical surfaces of the rings 24ª, after which they are fitted, by being permitted to expand to their normal external dimensions, into the annular seats 29 provided therefor in the opposite ends of the sleeve member 23, it being noted that the annular seats 29 are so located that the faces of the rings 27 which are presented toward the rollers are preferably in the same plane with the retaining walls 24ᶜ provided by the rings 24ª.

In assembling the rollers between the inner and outer sleeves, I prefer to provide the outer surface of the inner sleeve with a tacky lubricant, such as vaseline. The rollers 25 may then be applied to this surface and will remain in place without the external sleeve 23 or the rings 27, being retained in place by the lubricant and by the ring extension 24ª at one end of the sleeve 24. Then, the ring 23 may be slipped over the sleeve 24 and the rollers 25, with one of the rings 27 in place. This will permit the smaller rollers to be inserted from the opposite end of the assembly, after which the ring 27 at such opposite end will be snapped into place, thus completing the assembly.

In Fig. 10 there is shown a modification of the roller arrangement which is shown in the preceding views and which, while illustrated as embodied in the unit-bearing construction shown in Figs. 7, 8 and 9, may, of course, be employed with the construction shown in Figs. 1 to 6 inclusive. In this view, the smaller rollers, which are indicated at 30 are interposed between the larger rollers 31 and the inner bearing member. The inner and outer sleeve members in Fig. 10 being identical with those shown in Figs. 7, 8 and 9, are designated by the same numerals which apply to the said sleeve members in the preceding views; so also are the retaining ring extension 24ª and the snap ring 27. The smaller rollers, in the modification shown in Fig. 10 operate in exactly the same manner as do the smaller rollers in the preceding modifications of my invention.

The bearing shown and described herein has been extremely efficient in operation, withstanding unusually heavy torque without the development of heat which, as is well known, is extremely detrimental to the longevity of bearings.

Having thus described my invention, what I claim is:

In a bearing, the combination of an inner journal member and an outer sleeve member, a plurality of spaced rollers interposed between the journal member and the sleeve member, and a plurality of smaller rollers interposed between the first mentioned rollers and one of the said members, each of the smaller rollers being in rolling engagement with the two larger rollers adjacent thereto, the said sleeve member being provided at one end thereof with an end thrust plate for the end of the journal member adjacent thereto, the said end thrust plate having an annular surface extending radially outwardly beyond the portion which receives the thrust of the journal and adapted to limit the longitudinal movements of the rollers.

FREDERICK W. PETERS.